US012604075B2

(12) United States Patent
Dong et al.

(10) Patent No.: US 12,604,075 B2
(45) Date of Patent: Apr. 14, 2026

(54) DRIVE APPARATUS, IMAGE STABILIZATION IMAGING APPARATUS, AND TERMINAL

(71) Applicant: Huawei Technologies Co., Ltd., Shenzhen (CN)

(72) Inventors: Xiaoshi Dong, Shenzhen (CN); Jun Feng, Shenzhen (CN); Huaiyuan Chu, Shenzhen (CN); Jinghui Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 18/725,405

(22) PCT Filed: Nov. 29, 2022

(86) PCT No.: PCT/CN2022/135164
    § 371 (c)(1),
    (2) Date: Jul. 10, 2024

(87) PCT Pub. No.: WO2023/124709
    PCT Pub. Date: Jul. 6, 2023

(65) Prior Publication Data
    US 2025/0071401 A1     Feb. 27, 2025

(30) Foreign Application Priority Data

Dec. 31, 2021   (CN) .......................... 202111679340.8

(51) Int. Cl.
    *H04N 23/54* (2023.01)
    *H04N 23/57* (2023.01)
    *H04N 23/68* (2023.01)

(52) U.S. Cl.
    CPC ............. *H04N 23/54* (2023.01); *H04N 23/57* (2023.01); *H04N 23/687* (2023.01)

(58) Field of Classification Search
    CPC ...... H04N 23/54; H04N 23/57; H04N 23/687; G02B 27/646
    See application file for complete search history.

(56) References Cited

U.S. PATENT DOCUMENTS

| | | | |
|---|---|---|---|
| 8,004,780 B2 * | 8/2011 | Gutierrez ................. | G03B 3/10 |
| | | | 359/824 |
| 8,786,967 B2 * | 7/2014 | Wang ....................... | G03B 3/10 |
| | | | 359/823 |

(Continued)

FOREIGN PATENT DOCUMENTS

| | | | | |
|---|---|---|---|---|
| CN | 111225130 A | * | 6/2020 | ........... H04N 23/687 |
| WO | WO-2020103688 A1 | * | 5/2020 | ........... H04N 5/2257 |

*Primary Examiner* — Padma Haliyur
(74) *Attorney, Agent, or Firm* — Slater Matsil, LLP

(57) ABSTRACT

In accordance with an embodiment, a drive apparatus includes a substrate, a first movable structure, a second movable structure, a first fastening structure, a second fastening structure, a first connecting piece, a second connecting piece, and a drive structure. The first fastening structure is fastened to the substrate, and the first movable structure is connected to the first fastening structure by using the first connecting piece. The second movable structure is connected to the second fastening structure by using the second connecting piece, and the second movable structure is fastened to the first movable structure. A thickness of a first area on the first fastening structure is less than a thickness of a second area. A thickness of a third area on the second fastening structure is less than a thickness of a fourth area.

20 Claims, 12 Drawing Sheets

(56) References Cited

U.S. PATENT DOCUMENTS

| | | | |
|---|---|---|---|
| 10,196,259 B2 | 2/2019 | Morabito et al. | |
| 10,582,100 B1 | 3/2020 | Ba-Tis et al. | |
| 2012/0146171 A1* | 6/2012 | Kosaka | H04N 23/68 |
| | | | 257/E31.127 |
| 2018/0213154 A1* | 7/2018 | Ba-Tis | H04N 23/54 |
| 2019/0178775 A1* | 6/2019 | Feng | F04B 45/047 |
| 2020/0144936 A1 | 5/2020 | Liu et al. | |
| 2021/0281761 A1* | 9/2021 | Wang | G02B 27/646 |
| 2023/0126781 A1* | 4/2023 | Kuo | H04N 23/57 |
| | | | 348/208.7 |
| 2023/0219806 A1* | 7/2023 | Chen | H04N 23/687 |
| | | | 348/208.7 |
| 2024/0214681 A1* | 6/2024 | Xia | H04N 23/54 |

* cited by examiner

First axial direction       Second axial direction

1

DRIVE APPARATUS, IMAGE STABILIZATION IMAGING APPARATUS, AND TERMINAL

CROSS-REFERENCE TO RELATED APPLICATIONS

This application is a National Stage of International Patent Application No. PCT/CN2022/135164, filed on Nov. 29, 2022, which claims priority to Chinese Patent Application No. 202111679340.8, filed on Dec. 31, 2021, both of which are hereby incorporated by reference in their entireties.

TECHNICAL FIELD

This application relates to the MEMS field, and in particular, to a drive apparatus, an image stabilization imaging apparatus, and a terminal.

BACKGROUND

Image stabilization is one of important technologies in a current mobile camera device, and can improve imaging quality and improve user experience. The image stabilization includes a plurality of solutions such as electronic image stabilization, optical image stabilization, and micro gimbal image stabilization. The optical image stabilization means that a lens or an image sensor is placed on a micro motor, a shake amount is calculated by detecting shake of a device body, and then the information is transmitted to the micro motor, so that the micro motor moves in an opposite direction to implement compensation.

A current optical image stabilization solution is implemented by using a micro electro mechanical system (micro electro mechanical system, MEMS). A camera module usually includes a MEMS driver, an image sensor, a base board, and the like. The components are mechanically and electrically connected through die bonding, assembling, wire bonding, and the like. In this solution, the image sensor is directly stacked on the MEMS driver, resulting in a large overall thickness of the camera module.

SUMMARY

Embodiments of this application provide a drive apparatus, an image stabilization imaging apparatus, and a terminal, to reduce an overall thickness of the drive apparatus.

According to a first aspect, an embodiment of this application provides a drive apparatus. The drive apparatus includes a substrate, a first movable structure, a second movable structure, a first fastening structure, a second fastening structure, a first connecting piece, a second connecting piece, and a drive structure. The first fastening structure is fastened to the substrate, and the first movable structure is connected to the first fastening structure by using the first connecting piece. The second movable structure is connected to the second fastening structure by using the second connecting piece, and the second movable structure is fastened to the first movable structure. The first fastening structure includes a first area and a second area, and a thickness of the first area is less than a thickness of the second area. The second fastening structure includes a third area and a fourth area, and a thickness of the third area is less than a thickness of the fourth area. The first area is fixedly connected to the third area, the third area is located above the first area, and the second area and the fourth area do not overlap in a direction perpendicular to the substrate. The drive structure is located between the first fastening structure and the first movable structure, and/or the drive structure is located between the second fastening structure and the second movable structure. The drive structure is configured to drive the first movable structure and the second movable structure to move.

In this implementation, the first fastening structure and the second fastening structure may be divided into different areas based on different thicknesses. Respective thinner areas of the first fastening structure and the second fastening structure are at least partially attached vertically, and respective thicker areas are staggered from each other vertically. Therefore, an overall thickness of the first fastening structure and the second fastening structure that are assembled together is less than a sum of a maximum thickness of the first fastening structure and a maximum thickness of the second fastening structure, thereby reducing an overall thickness of the drive apparatus and facilitating implementation of a light and thin design.

In some possible implementations, the first movable structure is a movable platform, and the second movable structure is a movable frame. The drive apparatus further includes an image sensor, the image sensor is fastened to the first movable structure, and the image sensor is located on an inner side of the second movable structure. The foregoing manner provides a specific implementation of placing the image sensor. The drive structure may drive the image sensor to move by driving the first movable structure to move, thereby implementing optical image stabilization.

In some possible implementations, the first movable structure includes a first concave cavity, and the image sensor is fastened in the first concave cavity. Compared with a manner in which the image sensor is directly stacked on the first movable structure, this can further reduce the overall thickness of the drive apparatus.

In some possible implementations, the second movable structure is a movable platform, and the first movable structure is a movable platform or a movable frame. The drive apparatus further includes an image sensor, and the image sensor is fastened to the second movable structure. The foregoing manner provides another specific implementation of placing the image sensor. The drive structure may drive the image sensor to move by driving the second movable structure to move, thereby implementing optical image stabilization and enhancing scalability of this solution.

In some possible implementations, the second movable structure includes a second concave cavity, and the image sensor is fastened in the second concave cavity. Compared with a manner in which the image sensor is directly stacked on the second movable structure, this can further reduce the overall thickness of the drive apparatus.

In some possible implementations, the substrate is electrically connected to the first fastening structure, the image sensor is electrically connected to the first movable structure, and the first movable structure is electrically connected to the first fastening structure by using the first connecting piece, so that a signal of the image sensor is led out to the substrate. Electrical routing may be performed between the first movable structure and the first fastening structure along the first connecting piece, and the routing is more regular and neater.

In some possible implementations, the substrate is electrically connected to the second fastening structure, the image sensor is electrically connected to the second movable structure, and the second movable structure is electrically connected to the second fastening structure by using the second connecting piece, so that a signal of the image sensor is led out to the substrate. Electrical routing may be performed between the second movable structure and the second fastening structure along the second connecting piece, and the routing is more regular and neater.

In some possible implementations, the drive structure includes first drive comb teeth and second drive comb teeth, and the first connecting piece includes a first cantilever beam and a second cantilever beam. A first end of the first movable structure is connected to the first fastening structure by using the first cantilever beam, a second end of the first movable structure is connected to the first fastening structure by using the second cantilever beam, and the first end and the second end of the first movable structure are two ends of the first movable structure in a first axial direction. The first drive comb teeth include first fastening comb teeth and first movable comb teeth, the first fastening comb teeth and the first movable comb teeth are arranged in a staggered manner, the first movable comb teeth are connected to the first end of the first movable structure, and the first fastening comb teeth are connected to the first fastening structure. The second drive comb teeth include second fastening comb teeth and second movable comb teeth, the second fastening comb teeth and the second movable comb teeth are arranged in a staggered manner, the second movable comb teeth are connected to the second end of the first movable structure, and the second fastening comb teeth are connected to the first fastening structure. The first drive comb teeth and the second drive comb teeth are configured to drive the first movable structure and the second movable structure to move in the first axial direction. The foregoing manner provides specific implementations of the drive structure and the first connecting piece, to enhance implementability of this solution.

In some possible implementations, the drive structure further includes third drive comb teeth and fourth drive comb teeth, and the second connecting piece includes a third cantilever beam and a fourth cantilever beam. A first end of the second movable structure is connected to the second fastening structure by using the third cantilever beam, a second end of the second movable structure is connected to the second fastening structure by using the fourth cantilever beam, and the first end and the second end of the second movable structure are two ends of the second movable structure in a second axial direction. The third drive comb teeth include third fastening comb teeth and third movable comb teeth, the third fastening comb teeth and the third movable comb teeth are arranged in a staggered manner, the third movable comb teeth are connected to the first end of the second movable structure, and the third fastening comb teeth are connected to the second fastening structure. The fourth drive comb teeth include fourth fastening comb teeth and fourth movable comb teeth, the fourth fastening comb teeth and the fourth movable comb teeth are arranged in a staggered manner, the fourth movable comb teeth are connected to the second end of the second movable structure, and the fourth fastening comb teeth are connected to the second fastening structure. The third drive comb teeth and the fourth drive comb teeth are configured to drive the first movable structure and the second movable structure to move in the second axial direction. In this implementation, drive comb teeth at upper and lower layers may drive in different directions. In an application scenario of optical image stabilization, compensation in a plurality of directions can be implemented, and effect of optical image stabilization is better.

In some possible implementations, a first stopper structure is formed on the first fastening structure, and a second stopper structure is formed on the first movable structure. The first stopper structure and the second stopper structure are configured to stop the first movable structure and the second movable structure in a plane parallel to the first movable structure. In the foregoing manner, maximum horizontal displacement of the first movable structure and the second movable structure can be limited, thereby reducing a maximum stress in the drive apparatus, and improving reliability of the drive apparatus.

In some possible implementations, a third stopper structure is formed on the second fastening structure, a fourth stopper structure is formed on the second movable structure, and the third stopper structure and the fourth stopper structure are configured to stop the first movable structure and the second movable structure in a plane parallel to the second movable structure. In the foregoing manner, maximum horizontal displacement of the first movable structure and the second movable structure can also be limited, thereby improving flexibility of this solution.

In some possible implementations, a fifth stopper structure is formed on the first movable structure, and a sixth stopper structure is formed on the second fastening structure. The fifth stopper structure and the sixth stopper structure are configured to stop the first movable structure and the second movable structure in the direction perpendicular to the substrate. In this implementation, stopper structures may be further disposed to limit displacement of the first movable structure and the second movable structure in the direction perpendicular to the substrate, thereby avoiding damage to the first connecting piece and the second connecting piece, and improving reliability of the drive apparatus.

In some possible implementations, a seventh stopper structure is formed on the first fastening structure, and an eighth stopper structure is formed on the second movable structure. The seventh stopper structure and the eighth stopper structure are configured to stop the first movable structure and the second movable structure in the direction perpendicular to the substrate. In the foregoing manner, displacement of the first movable structure and the second movable structure in the direction perpendicular to the substrate can also be limited, thereby improving flexibility of this solution.

In some possible implementations, a boss or a through hole is provided on the substrate. In a process of assembling the drive apparatus, the first movable structure may be supported by using the boss, or the first movable structure may be supported by using a supporting column passing through the through hole, to improve reliability in the process of assembling.

In some possible implementations, the first fastening structure is a first fastening frame, and the first movable structure is located on an inner side of the first fastening frame. The second fastening structure is a second fastening frame, and the second movable structure is located on an inner side of the second fastening frame. Overall stability of the drive apparatus is improved by using a frame as a fastening structure.

In some possible implementations, the first movable structure is a first movable frame, the first fastening structure is located on an inner side of the first movable structure, the second movable structure is a second movable frame, and the second fastening structure is located on an inner side of the second movable structure. A difference from the foregoing implementation lies in that, in this implementation, positions of fastening structures and movable structures may be further adjusted, thereby improving scalability of this solution.

In some possible implementations, the drive apparatus further includes the image sensor, and the image sensor is fastened to the second movable structure. The foregoing manner provides a specific implementation of placing the image sensor. The drive structure may drive the image sensor to move by driving the second movable structure to move, thereby implementing optical image stabilization.

In some possible implementations, the substrate is a printed circuit board (printed circuit board, PCB).

According to a second aspect, an embodiment of this application provides an image stabilization imaging apparatus. The image stabilization imaging apparatus includes a controller and the drive apparatus described in any implementation of the first aspect. The controller is electrically connected to the drive apparatus. The drive apparatus includes an image sensor. The controller is configured to output a control signal to the drive apparatus, to control the drive apparatus to drive the image sensor to move.

According to a third aspect, an embodiment of this application provides a terminal. The terminal includes a processor, a memory, and the image stabilization imaging apparatus described in the second aspect. The processor, the memory, and the image stabilization imaging apparatus are connected to each other through a bus. The memory is configured to store a program and instructions, and the processor is configured to invoke the program and the instructions stored in the memory to control the image stabilization imaging apparatus.

In embodiments of this application, the first fastening structure and the second fastening structure may be divided into different areas based on different thicknesses. Respective thinner areas of the first fastening structure and the second fastening structure are at least partially attached vertically, and respective thicker areas are staggered from each other vertically. Therefore, an overall thickness of the first fastening structure and the second fastening structure that are assembled together is less than a sum of a maximum thickness of the first fastening structure and a maximum thickness of the second fastening structure, thereby reducing an overall thickness of the drive apparatus and facilitating implementation of a light and thin design.

DETAILED DESCRIPTION OF ILLUSTRATIVE EMBODIMENTS

Embodiments of this application provide a drive apparatus, an image stabilization imaging apparatus, and a terminal, to reduce an overall thickness of the drive apparatus. In the specification, claims, and accompanying drawings of this application, the terms such as "first" and "second" (if any) are intended to distinguish between similar objects but do not necessarily indicate a specific order or sequence. It should be understood that the data termed in such a way are interchangeable in proper circumstances, so that embodiments described herein can be implemented in an order other than the order illustrated or described herein. In addition, the terms "including", "having", and any variations thereof are intended to cover a non-exclusive inclusion. For example, a process, method, system, product, or device including a series of steps or units is not necessarily limited to those steps or units explicitly listed, but may include other steps or units not explicitly listed or inherent to the process, method, product, or device.

Figure 1A:
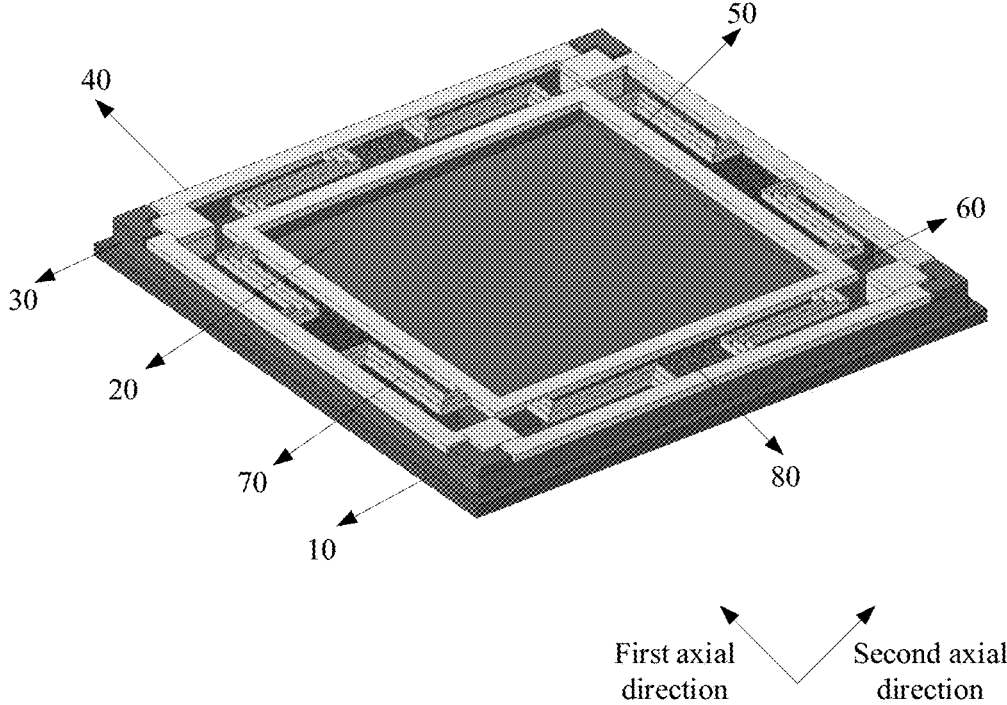
FIG. 1(a) is a three-dimensional diagram of a first structure of a drive apparatus according to an embodiment of this application.
Figure 1B:
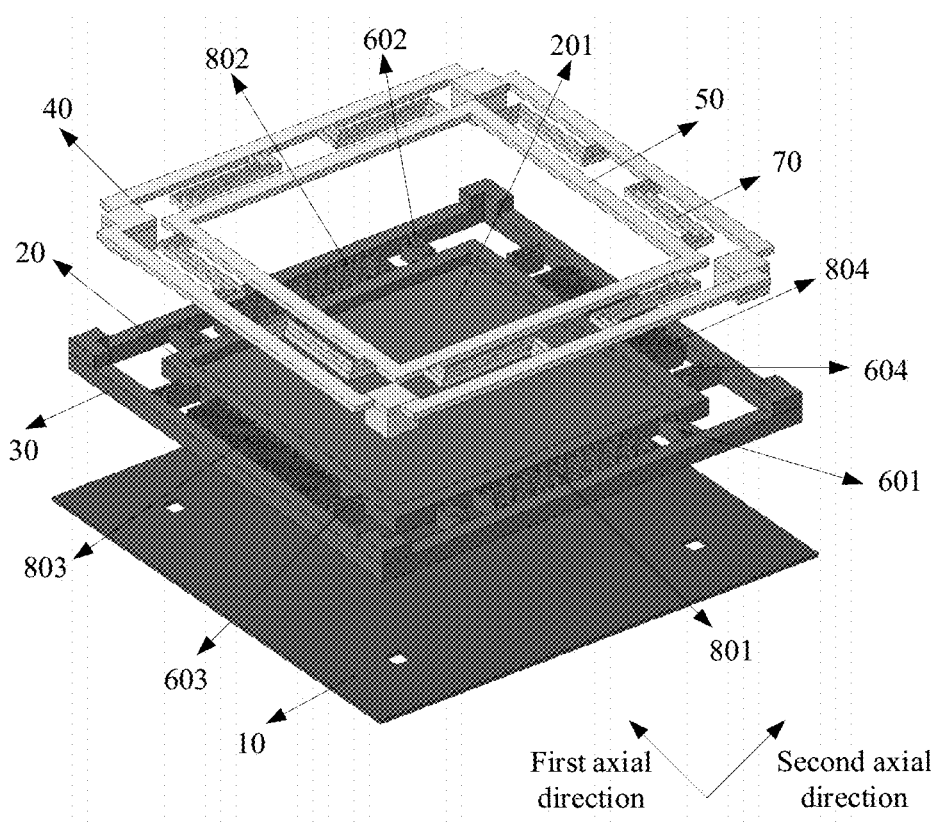
FIG. 1(b) is an exploded view of a first structure of a drive apparatus according to an embodiment of this application.

FIG. 1(a) is a three-dimensional diagram of a first structure of a drive apparatus according to an embodiment of this application. FIG. 1(b) is an exploded view of a first structure of a drive apparatus according to an embodiment of this application. As shown in FIG. 1(a) and FIG. 1(b), the drive apparatus includes: a substrate 10, a first movable structure 20, a first fastening structure 30, a second fastening structure 40, a second movable structure 50, a first connecting piece 60, a second connecting piece 70, and a drive structure 80. The first fastening structure 30 is fastened to the substrate 10. The first movable structure 20 is connected to the first fastening structure 30 by using the first connecting piece 60. The second movable structure 50 is connected to the second fastening structure 40 by using the second connecting piece 70. The second movable structure 50 is fastened to the first movable structure 20. It should be understood that a quantity of first connecting pieces 60 and a quantity of second connecting pieces 70 are not limited in this application.

The drive structure 80 is located between the first fastening structure 30 and the first movable structure 20, and/or the drive structure 80 is located between the second fastening structure 40 and the second movable structure 50. The drive structure 80 is configured to drive the first movable structure 20 and the second movable structure 50 to move. In other words, this application provides a plurality of design solutions of the drive structure, and because the first movable structure 20 and the second movable structure 50 are fastened together, the drive structure 80 needs only to drive either of the first movable structure 20 and the second movable structure 50 to move. In the following, the structure shown in FIG. 1(*b*) is first used as an example to describe a specific implementation of the drive structure 80.

As shown in FIG. 1(*b*), the drive structure 80 includes drive comb teeth 801 and drive comb teeth 802, and the drive comb teeth 801 and the drive comb teeth 802 have respective fastening comb teeth and movable comb teeth. The first connecting piece 60 includes a cantilever beam 601 and a cantilever beam 602. Specifically, fastening comb teeth and movable comb teeth in the drive comb teeth 801 are arranged in a staggered manner, the fastening comb teeth in the drive comb teeth 801 are connected to the first fastening structure 30, and the movable comb teeth in the drive comb teeth 801 are connected to a first end of the first movable structure 20. The first end of the first movable structure 20 is further connected to the first fastening structure 30 by using the cantilever beam 601. Fastening comb teeth and movable comb teeth in the drive comb teeth 802 are arranged in a staggered manner, the fastening comb teeth in the drive comb teeth 802 are connected to the first fastening structure 30, and the movable comb teeth in the drive comb teeth 802 are connected to a second end of the first movable structure 20. The second end of the first movable structure 20 is further connected to the first fastening structure 30 by using the cantilever beam 602. The first end and the second end of the first movable structure 20 are two ends of the first movable structure 20 in a first axial direction. It should be understood that attraction between the fastening comb teeth and the movable comb teeth may be changed by changing an electric potential between the fastening comb teeth and the movable comb teeth, so that the drive comb teeth 801 and the drive comb teeth 802 drive the first movable structure 20 to move in the first axial direction.

In some possible implementations, the drive structure 80 further includes drive comb teeth 803 and drive comb teeth 804, and the first connecting piece 60 further includes a cantilever beam 603 and a cantilever beam 604. A third end of the first movable structure 20 is connected to the first fastening structure 30 by using the cantilever beam 603, and a fourth end of the first movable structure 20 is connected to the first fastening structure 30 by using the cantilever beam 604. The third end and the fourth end of the first movable structure 20 are two ends of the first movable structure 20 in a second axial direction. The drive comb teeth 803 and the drive comb teeth 804 have respective fastening comb teeth and movable comb teeth. Specifically, fastening comb teeth and movable comb teeth in the drive comb teeth 803 are arranged in a staggered manner, the fastening comb teeth in the drive comb teeth 803 are connected to the first fastening structure 30, and the movable comb teeth in the drive comb teeth 803 are connected to the third end of the first movable structure 20. Fastening comb teeth and movable comb teeth in the drive comb teeth 804 are arranged in a staggered manner, the fastening comb teeth in the drive comb teeth 804 are connected to the first fastening structure 30, and the movable comb teeth in the drive comb teeth 804 are connected to the fourth end of the first movable structure 20. It should be understood that attraction between the fastening comb teeth and the movable comb teeth may be changed by changing an electric potential between the fastening comb teeth and the movable comb teeth, so that the drive comb teeth 803 and the drive comb teeth 804 drive the first movable structure 20 to move in the second axial direction.

It should be noted that the first fastening structure 30 and the second fastening structure 40 are fastened together, and the first fastening structure 30 and the second fastening structure 40 may be divided into different areas based on different thicknesses. Specifically, the first fastening structure 30 includes a first area and a second area, and a thickness of the first area is less than a thickness of the second area. The second fastening structure 40 includes a third area and a third area, and a thickness of the third area is less than a thickness of the fourth area. The third area is located above the first area and is fixedly connected to the first area, and the second area and the fourth area do not overlap in a direction perpendicular to the substrate. In other words, a thinner area of the second fastening structure 40 is stacked above a thinner area of the first fastening structure 30 and the two areas are fixedly connected, and a thicker area of the second fastening structure 40 and a thicker area of the first fastening structure 30 are not directly stacked but staggered from each other. Therefore, an overall thickness do of the first fastening structure 30 and the second fastening structure 40 that are assembled together is less than a sum of a maximum thickness d1 of the first fastening structure 30 and a maximum thickness d2 of the second fastening structure 40. It should be understood that in the direction perpendicular to the substrate, the first area and the third area may completely overlap, or may only partially overlap. This is not specifically limited herein. FIG. 1(*a*) and FIG. 1(*b*) are used as an example. Both the first fastening structure 30 and the second fastening structure 40 are rectangular, areas at four corners of each of the first fastening structure 30 and the second fastening structure 40 are thicker areas, and areas at four edges of each of the first fastening structure 30 and the second fastening structure 40 are thinner areas. The four edges of the first fastening structure 30 and the four edges of the second fastening structure 40 are respectively attached together vertically, and the four corners of the first fastening structure 30 and the four corners of the second fastening structure 40 are respectively clamped together vertically.

In an example, a sum of the thickness of the thinner first area on the first fastening structure 30 and the thickness of the thinner third area on the second fastening structure 40 is equal to the thickness of the thicker second area on the first fastening structure 30. In addition, the thickness of the thicker second area on the first fastening structure 30 is equal to the thickness of the thicker fourth area on the second fastening structure 40. Preferably, a thickness of the first movable structure 20 is the same as the thickness of the thinner first area on the first fastening structure 30. A thickness of the second movable structure 50 is the same as the thickness of the thinner third area on the second fastening structure 40. In this way, the overall thickness of the first fastening structure 30 and the second fastening structure 40 that are assembled together is the same as an overall thickness of the first movable structure 20 and the second movable structure 50 that are assembled together.

It should be understood that, in actual application, the first fastening structure 30 and the second fastening structure 40 may be flexibly divided into areas with different thicknesses, provided that it can be ensured that respective thinner areas of the first fastening structure 30 and the second fastening structure 40 can be at least partially attached vertically, and respective thicker areas are staggered from each other vertically. This is not specifically limited herein. The following further provides another possible implementation.

Figure 2A:
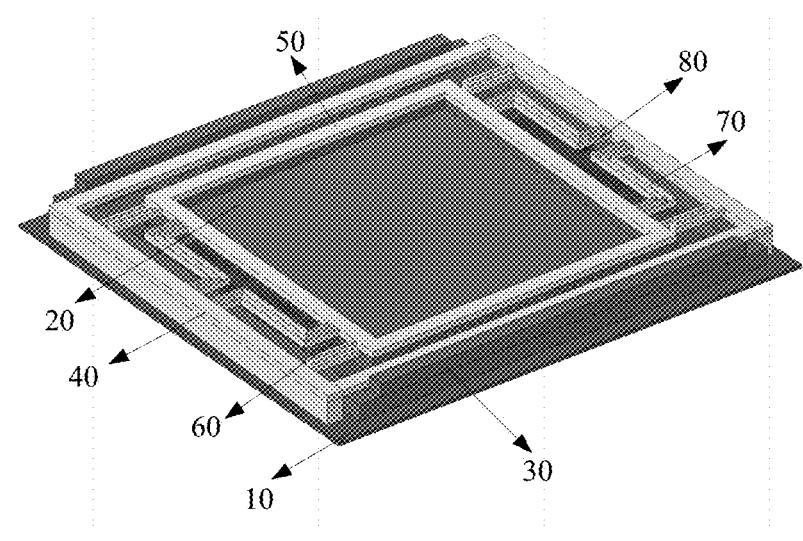
FIG. 2(a) is a three-dimensional diagram of a second structure of a drive apparatus according to an embodiment of this application.
Figure 2B:
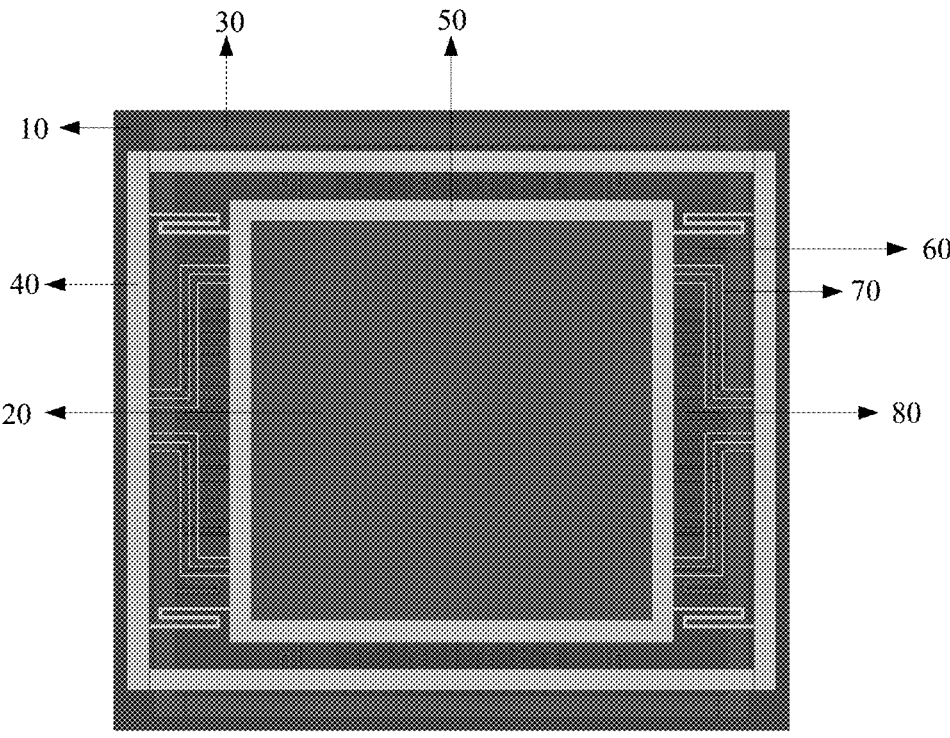
FIG. 2(b) is a top view of a second structure of a drive apparatus according to an embodiment of this application.

FIG. 2(*a*) is a three-dimensional diagram of a second structure of a drive apparatus according to an embodiment of this application. FIG. 2(*b*) is a top view of a second structure of a drive apparatus according to an embodiment of this application. As shown in FIG. 2(*a*) and FIG. 2(*b*), both a first fastening structure 30 and a second fastening structure 40 are rectangular, a length of a first group of opposite edges of the first fastening structure 30 is less than a length of a first group of opposite edges of the second fastening structure 40, and the first group of opposite edges of the first fastening structure 30 are parallel to the first group of opposite edges of the second fastening structure 40. A length of a second group of opposite edges of the first fastening structure 30 is greater than a length of a second group of opposite edges of the second fastening structure 40, and the second group of opposite edges of the first fastening structure 30 are parallel to the second group of opposite edges of the second fastening structure 40. Therefore, the first fastening structure 30 and the second fastening structure 40 may be assembled together in a vertically clamping manner. Specifically, the first group of opposite edges of the first fastening structure 30 are thinner first areas, and the second group of opposite edges of the first fastening structure 30 are thicker second areas. The first group of opposite edges of the second fastening structure 40 are thicker fourth areas, and the second group of opposite edges of the second fastening structure 40 are thinner third areas. The first area and the third area are fixedly connected to each other at four positions close to four corners. Except positions at which the first fastening structure 30 and the second fastening structure 40 are fixedly connected, other positions of the first fastening structure 30 and the second fastening structure 40 are clamped to each other. It should be understood that, for a drive structure 80 and a first connecting piece 60 in the structures shown in FIG. 2(*a*) and FIG. 2(*b*), refer to related descriptions of the embodiment shown in FIG. 1(*b*), and reference numerals and text descriptions are not provided herein again.

In a possible implementation, as shown in FIG. 1(*a*) and FIG. 1(*b*), the first fastening structure 30 is a first fastening frame, and the second fastening structure 40 is a second fastening frame. The first movable structure 20 is located on an inner side of the first fastening structure 30, and the second movable structure 50 is located on an inner side of the second fastening structure 40. Overall stability of the drive apparatus can be provided by using a frame as a fastening structure. It should be understood that, in actual application, the first fastening structure 30 and the second fastening structure 40 may also be non-frame structures. For example, the first fastening structure 30 may be divided into a plurality of independent parts distributed around the first movable structure 20, and each part of the first fastening structure 30 may be connected to the first movable structure 20 by using the first connecting piece 60. Similarly, the second fastening structure 40 may be divided into a plurality of independent parts distributed around the second movable structure 50, and each part of the second fastening structure 40 may be connected to the second movable structure 50 by using the second connecting piece 70.

It should be noted that components of the drive apparatus on the substrate 10 may be divided into structures at upper and lower layers in general. A first layer structure includes the first movable structure 20, the first fastening structure 30, and the first connecting piece 60. A second layer structure includes the second fastening structure 40, the second movable structure 50, and the second connecting piece 70. Specifically, the first layer structure and the second layer structure may implement different functions. The following separately provides descriptions with reference to different embodiments.

Figure 3A:
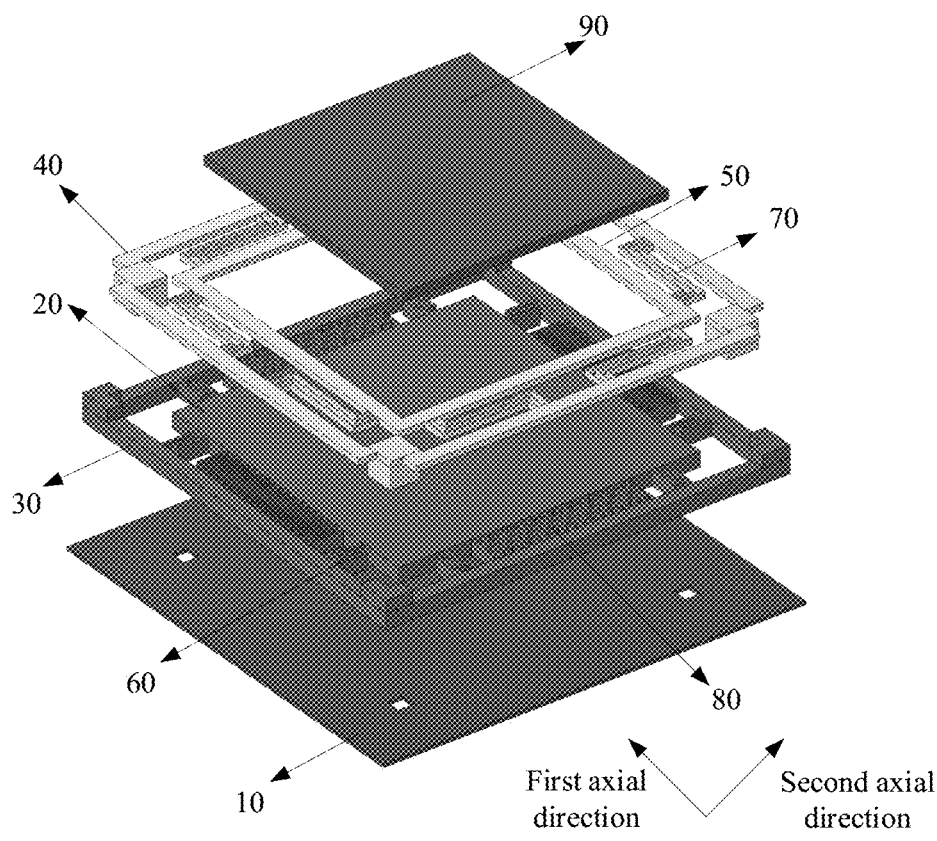
FIG. 3(a) is an exploded view of a third structure of a drive apparatus according to an embodiment of this application.
Figure 3B:
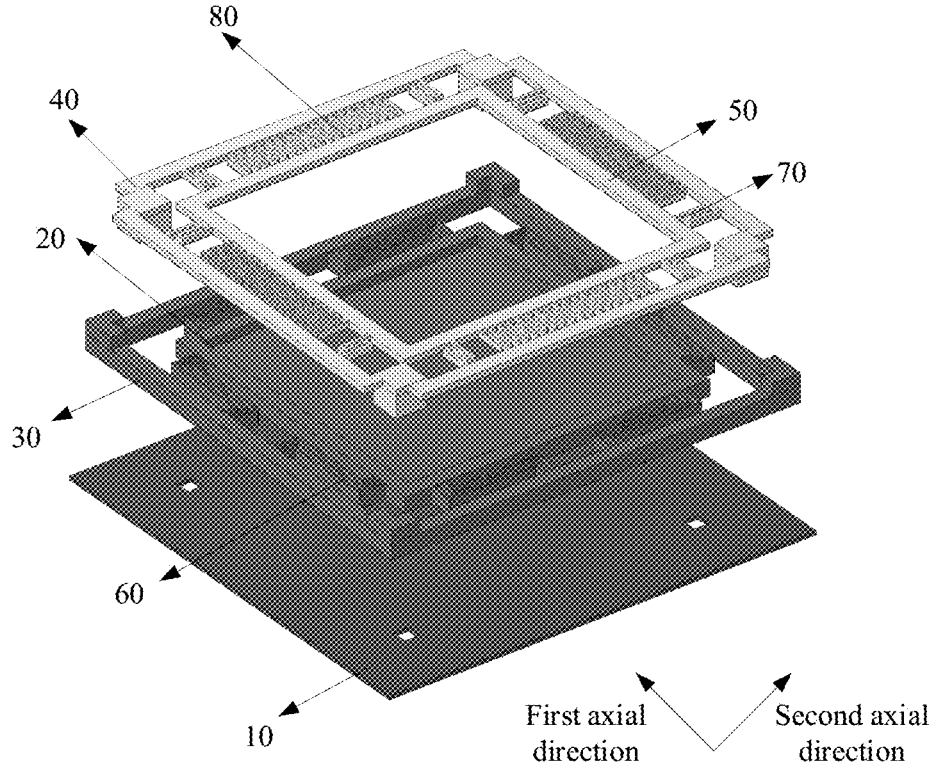
FIG. 3(b) is an exploded view of a fourth structure of a drive apparatus according to an embodiment of this application.

FIG. 3(*a*) is an exploded view of a third structure of a drive apparatus according to an embodiment of this application. As shown in FIG. 3(*a*), the drive apparatus further includes an image sensor 90. The image sensor 90 is fastened to the first movable structure 20, the drive structure 80 is located between the first movable structure 20 and the first fastening structure 30, and the drive structure 80 drives the image sensor 90 to move by driving the first movable structure 20 to move, to implement an optical image stabilization function. To enable a signal of the image sensor 90 to be led out to the substrate 10, an electrical connection between the image sensor 90 and the substrate 10 needs to be implemented. Specifically, the substrate 10 is electrically connected to the second fastening structure 40, the image sensor 90 is electrically connected to the second movable structure 50, and the second movable structure 50 is electrically connected to the second fastening structure 40 by using the second connecting piece 70. It should be understood that electrical routing may be performed between the second movable structure 50 and the second fastening structure 40 along the second connecting piece 70, and the routing is more regular and neater. As an example, the substrate 10 is specifically a printed circuit board (printed circuit board, PCB). In this implementation, the first layer structure is configured to drive the image sensor 90, and the second layer structure is configured to electrically connect the image sensor 90 to the substrate.

It should be understood that, function switching between the first layer structure and the second layer structure may also be implemented through proper changes based on the structure shown in FIG. 3(*a*). That is, the second layer structure is configured to drive the image sensor 90, and the first layer structure is configured to electrically connect the image sensor 90 to the substrate. FIG. 3(*b*) is an exploded view of a fourth structure of a drive apparatus according to an embodiment of this application. As shown in FIG. 3(*b*), the drive structure 80 is located between the second movable structure 50 and the second fastening structure 40. The drive structure 80 drives the image sensor 90 to move by driving the second movable structure 50 to move, to implement an optical image stabilization function. An implementation of the drive structure 80 is similar to the manner described in FIG. 1(*b*), and details are not described herein again. The substrate 10 is electrically connected to the first fastening structure 30, the image sensor 90 is electrically connected to the first movable structure 20, and the first movable structure 20 is electrically connected to the first fastening structure 30 by using the first connecting piece 60. Electrical routing may be performed between the first movable structure 20 and the first fastening structure 30 along the first connecting piece 60, and the routing is more regular and neater.

In some possible implementations, as shown in FIG. 1(*b*), a first concave cavity 201 may be further disposed on the first movable structure 20, so that the image sensor 90 is fastened in the first concave cavity 201. Compared with a manner in which the image sensor 90 is directly stacked on the first movable structure 20, this can further reduce the overall thickness of the drive apparatus.

Figure 4:
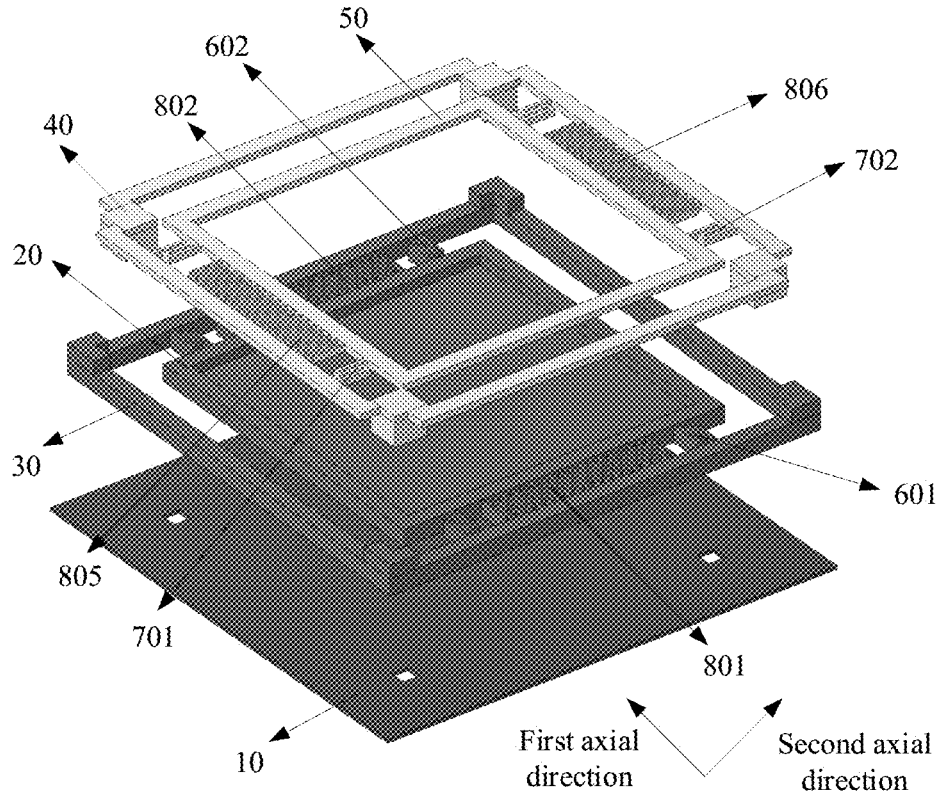
FIG. 4 is an exploded view of a fifth structure of a drive apparatus according to an embodiment of this application.

FIG. 4 is an exploded view of a fifth structure of a drive apparatus according to an embodiment of this application. As shown in FIG. 4, the drive structure 80 includes drive comb teeth 801, drive comb teeth 802, drive comb teeth 805, and drive comb teeth 806. The first connecting piece 60 specifically includes a cantilever beam 601 and a cantilever beam 602, and the second connecting piece 70 includes a cantilever beam 701 and a cantilever beam 702. For the drive comb teeth 801, the drive comb teeth 802, the cantilever beam 601, and the cantilever beam 602, refer to related descriptions of the embodiment shown in FIG. 1(b). Details are not described herein again. A first end of the second movable structure 50 is connected to the second fastening structure 40 by using the cantilever beam 701, and a second end of the second movable structure 50 is connected to the second fastening structure 40 by using the cantilever beam 702. The first end and the second end of the second movable structure 50 are two ends of the second movable structure 50 in a second axial direction. The drive comb teeth 805 and the drive comb teeth 806 have respective fastening comb teeth and movable comb teeth. Specifically, fastening comb teeth and movable comb teeth in the drive comb teeth 805 are arranged in a staggered manner, the fastening comb teeth in the drive comb teeth 805 are connected to the second fastening structure 40, and the movable comb teeth in the drive comb teeth 805 are connected to the first end of the second movable structure 50. Fastening comb teeth and movable comb teeth in the drive comb teeth 806 are arranged in a staggered manner, the fastening comb teeth in the drive comb teeth 806 are connected to the second fastening structure 40, and the movable comb teeth in the drive comb teeth 806 are connected to the second end of the second movable structure 50. It should be understood that attraction between the fastening comb teeth and the movable comb teeth may be changed by changing an electric potential between the fastening comb teeth and the movable comb teeth, so that the drive comb teeth 805 and the drive comb teeth 806 drive the second movable structure 50 to move in the second axial direction. Because the second movable structure 50 is fixedly connected to the first movable structure 20, it is equivalent to that the drive comb teeth 805 and the drive comb teeth 806 may drive the first movable structure 20 to move in the second axial direction. In this embodiment, both the first layer structure and the second layer structure are configured to implement a drive function, and drive comb teeth in the structures at the upper and lower layers drive in different directions. In an application scenario of optical image stabilization, compensation in a plurality of directions can be implemented, and effect of optical image stabilization is better.

Figure 5:
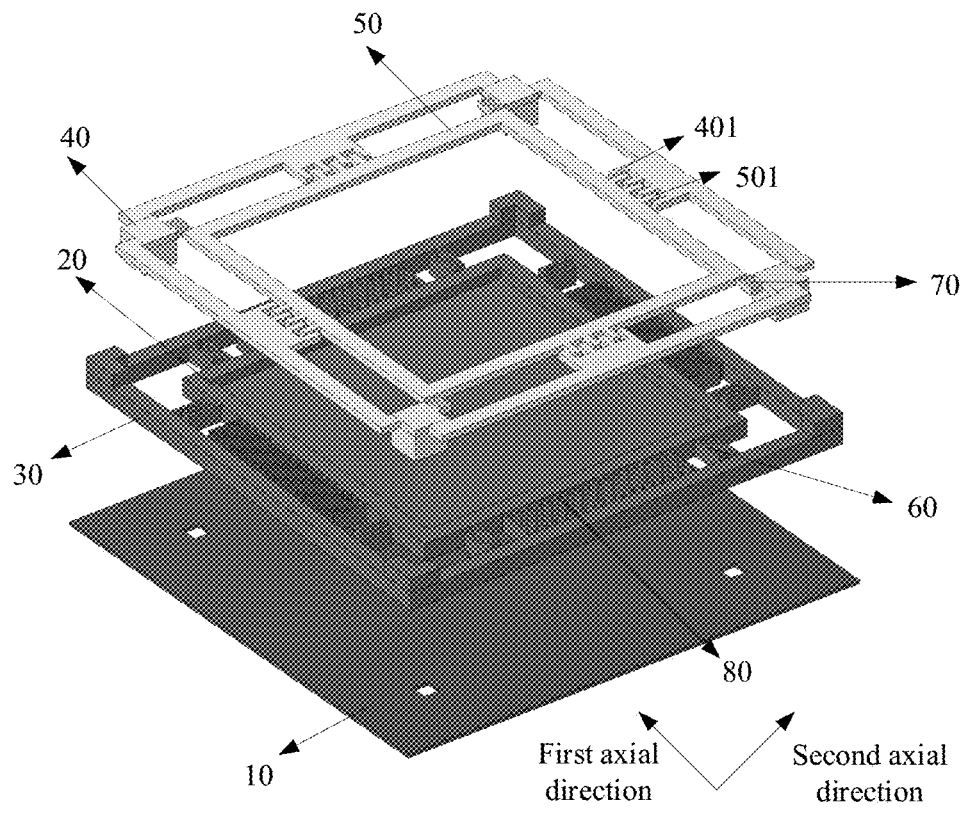
FIG. 5 is an exploded view of a sixth structure of a drive apparatus according to an embodiment of this application.

FIG. 5 is an exploded view of a sixth structure of a drive apparatus according to an embodiment of this application. As shown in FIG. 5, a stopper structure 401 is further formed on the second fastening structure 40, and a stopper structure 402 is further formed on the second movable structure 50. When horizontal displacement of the first movable structure 20 and the second movable structure 50 is relatively large, the stopper structure 401 abuts against the stopper structure 501, thereby limiting maximum horizontal displacement of the first movable structure 20 and the second movable structure 50, reducing a maximum stress in the drive apparatus, and improving reliability of the drive apparatus. It should be understood that the stopper structure 401 and the stopper structure 501 are disposed in pairs. A specific quantity of stopper structures 401 and stopper structures 501 is not limited in this application.

In some possible implementations, the stopper structure 401 may also be formed on the first fastening structure 30, and the stopper structure 501 may also be formed on the first movable structure 20. Accompanying drawings are not provided herein again. When horizontal displacement between the first movable structure 20 and the second movable structure 50 is relatively large, maximum horizontal displacement of the first movable structure 20 and the second movable structure 50 can also be limited. That is, horizontal stopper structures may be disposed in the structures at both the upper and lower layers, thereby improving flexibility of this solution.

Figure 6A:
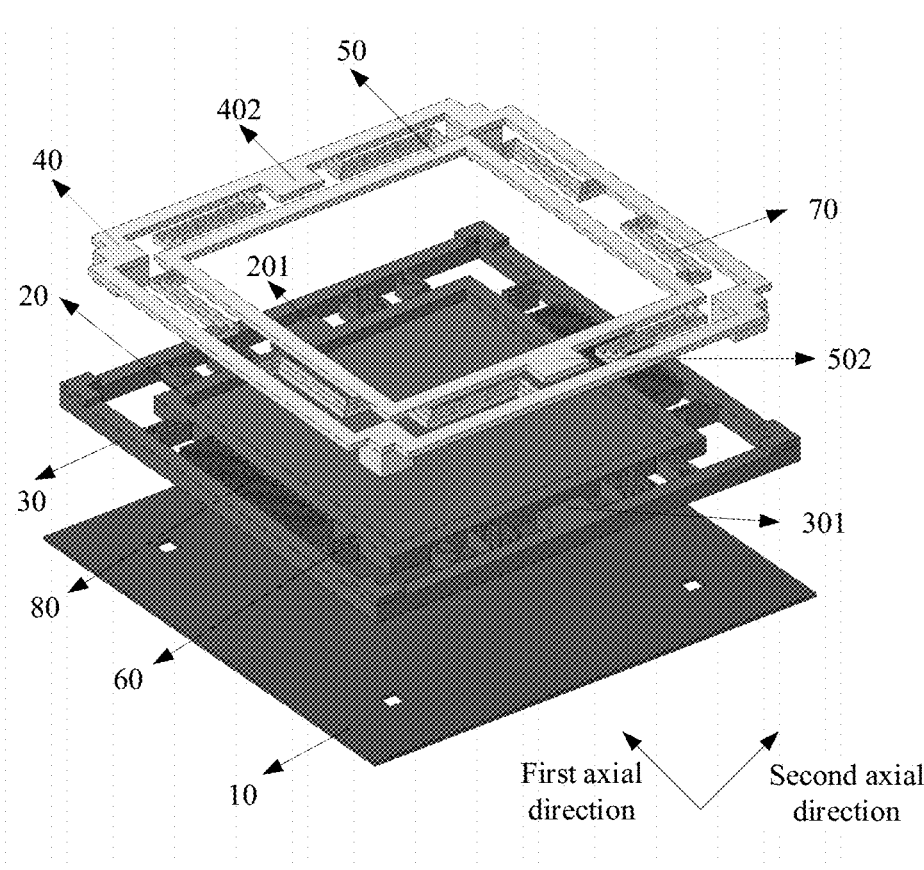
FIG. 6(a) is an exploded view of a seventh structure of a drive apparatus according to an embodiment of this application.
Figure 6B:
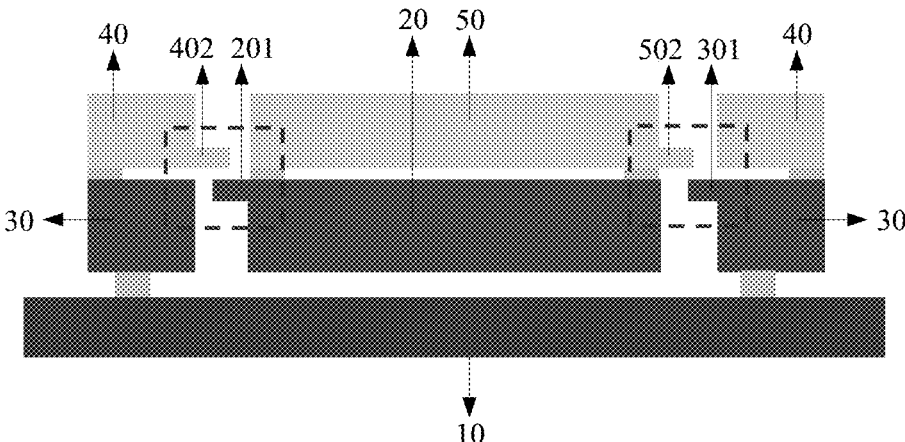
FIG. 6(b) is a diagram of a longitudinal section of a seventh structure of a drive apparatus according to an embodiment of this application.

FIG. 6(a) is an exploded view of a seventh structure of a drive apparatus according to an embodiment of this application. FIG. 6(b) is a diagram of a longitudinal section of a seventh structure of a drive apparatus according to an embodiment of this application. As shown in FIG. 6(a) and FIG. 6(b), a stopper structure 201 is formed on the first movable structure 20, a stopper structure 301 is formed on the first fastening structure 30, a stopper structure 402 is formed on the second fastening structure 40, and a stopper structure 502 is formed on the second movable structure 50. The stopper structure 402 and the stopper structure 201 form a group. When the first movable structure 20 and the second movable structure 50 move in a direction away from the substrate 10, the stopper structure 402 abuts against stopper structure 201, thereby limiting maximum displacement of the first movable structure 20 and the second movable structure 50 in the direction away from the substrate 10. The stopper structure 502 and the stopper structure 301 form a group. When the first movable structure 20 and the second movable structure 50 move in a direction close to the substrate 10, the stopper structure 502 abuts against the stopper structure 301, thereby limiting maximum displacement of the first movable structure 20 and the second movable structure 50 in the direction close to the substrate 10. In other words, in this solution, stopper structures may be further disposed to limit displacement of the first movable structure 20 and the second movable structure 50 in the direction perpendicular to the substrate 10, thereby improving reliability of the drive apparatus.

It should be noted that, in embodiments shown in FIG. 1(a) to FIG. 6(b), the first movable structure 20 is a movable platform, and the second movable structure 50 is a movable frame. That is, the image sensor 90 is fastened to the first movable structure 20, and the image sensor 90 is located on an inner side of the second movable structure 50. In some possible implementations, the second movable structure 50 may also be designed as a movable platform, and the first movable structure 20 may be a movable frame or a movable platform. That is, the image sensor may also be fastened to the second movable structure 50. In the following, an example in which both the second movable structure 50 and the first movable structure 20 are movable platforms is used for further description.

Figure 7A:
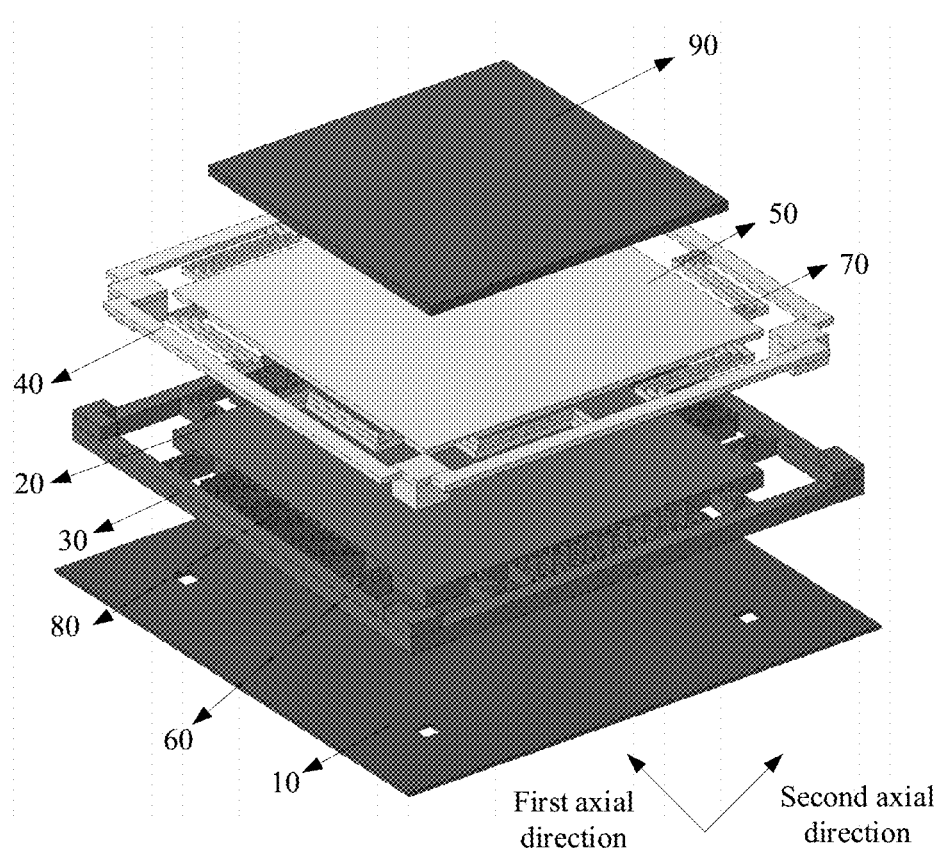
FIG. 7(a) is an exploded view of an eighth structure of a drive apparatus according to an embodiment of this application.

FIG. 7(a) is an exploded view of an eighth structure of a drive apparatus according to an embodiment of this application. As shown in FIG. 7(a), a difference from the embodiment shown in FIG. 3(a) lies in that the image sensor 90 in this embodiment is fastened to the second movable structure 50, and the second movable structure 50 is a movable platform. It should be understood that, for structures in the structure shown in FIG. 7(a) other than the second movable structure 50, refer to related descriptions of the foregoing embodiments. Details are not described herein again.

Figure 7B:
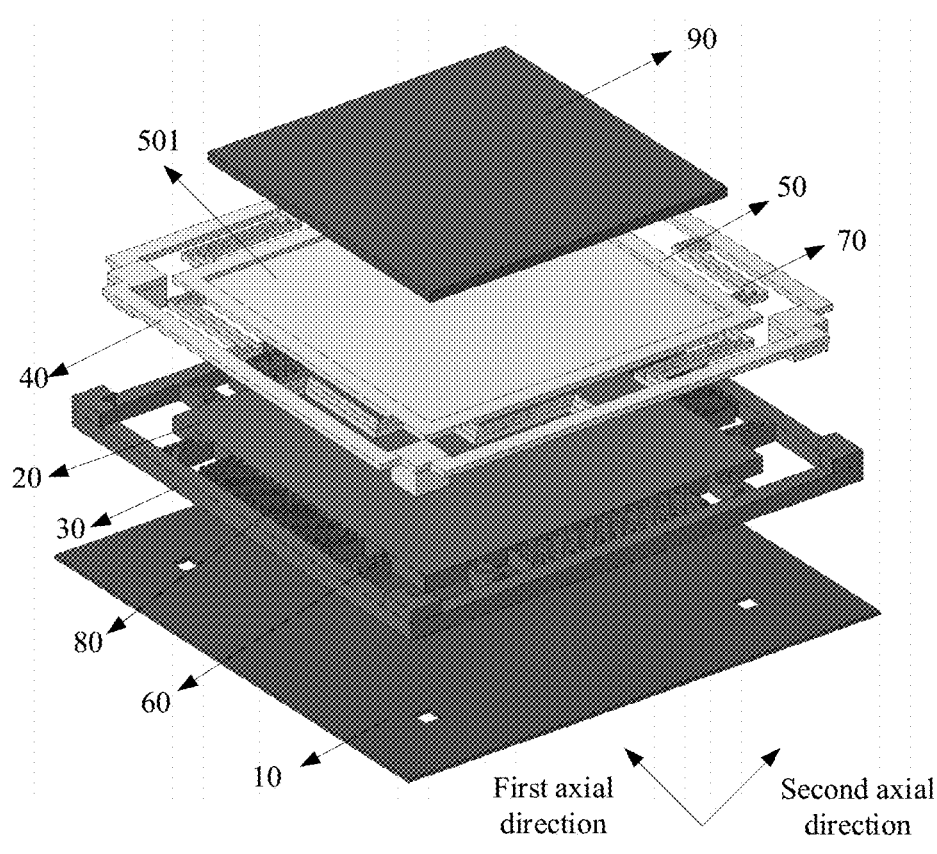
FIG. 7(b) is an exploded view of a ninth structure of a drive apparatus according to an embodiment of this application.

FIG. 7(b) is an exploded view of a ninth structure of a drive apparatus according to an embodiment of this application. As shown in FIG. 7(b), in some possible implementations, a second concave cavity 501 may be further disposed on the second movable structure 50, so that the image sensor 90 is fastened in the second concave cavity 501. Compared with a manner in which the image sensor 90 is directly stacked on the second movable structure 50, this can further reduce the overall thickness of the drive apparatus.

It should be noted that, in some possible implementations, corresponding variations may further be performed based on the drive apparatus shown in FIG. 7(a) and FIG. 7(b) with reference to related designs of the drive apparatus shown in FIG. 2(a), FIG. 2(b), and FIG. 4 to FIG. 6(b). For details, refer to related descriptions of embodiments shown in FIG. 2(a), FIG. 2(b), and FIG. 4 to FIG. 6(b), and accompanying drawings and text descriptions are not provided one by one herein again.

Figure 8A:
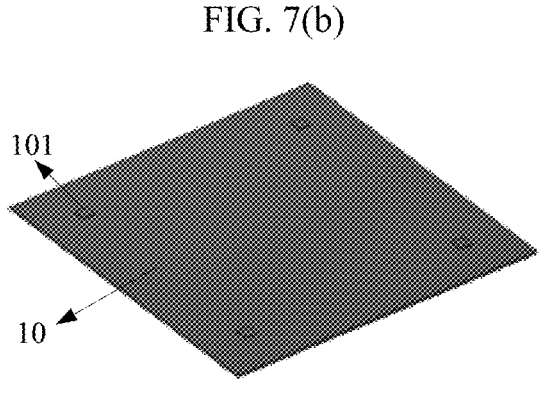
FIG. 8(a) is a diagram of a first structure of a substrate according to an embodiment of this application.
Figure 8B:
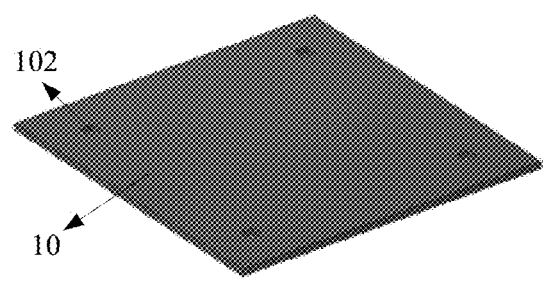
FIG. 8(b) is a diagram of a second structure of a substrate according to an embodiment of this application.

FIG. 8(a) is a diagram of a first structure of a substrate according to an embodiment of this application. FIG. 8(b) is a diagram of a second structure of a substrate according to an embodiment of this application. As shown in FIG. 8(a), a boss 101 may be further disposed on the substrate 10. As shown in FIG. 8(b), a through hole 102 may be further disposed on the substrate. It should be understood that quantities and shapes of bosses 101 and through holes 102 are not limited in this application. In a process of assembling the drive apparatus, the first movable structure 20 may be supported by using the boss 101, or the first movable structure 20 may be supported by using a supporting column passing through the through hole 102, to improve reliability in the process of assembling.

In some possible implementations, positions of fastening structures and movable structures may be further adjusted based on the drive apparatus described in the foregoing embodiments. The following provides descriptions with reference to the accompanying drawings.

Figure 9:
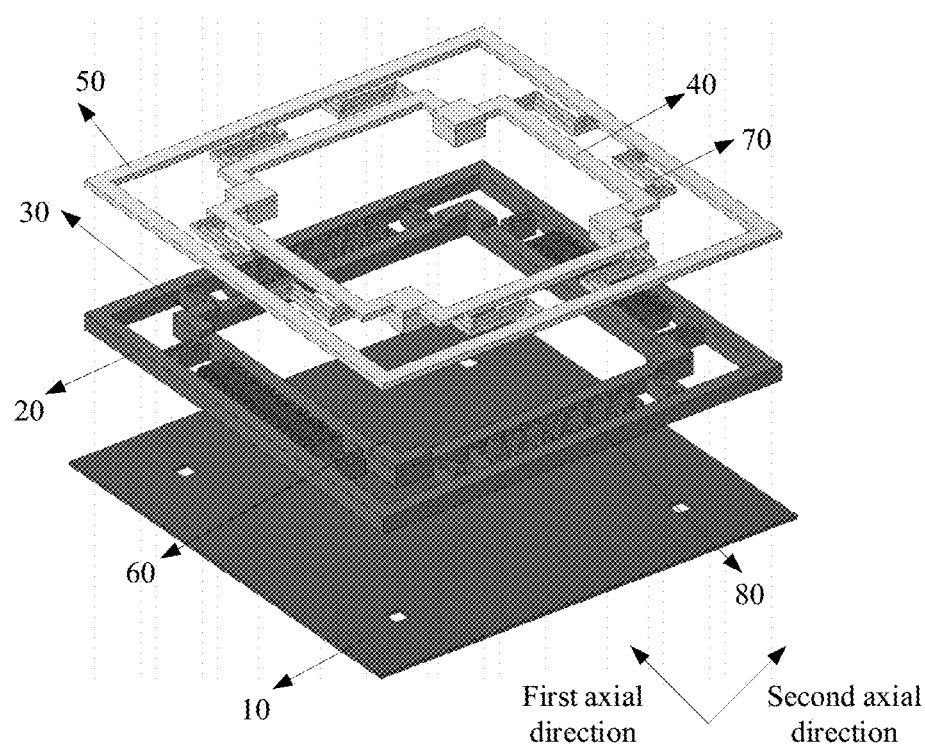
FIG. 9 is an exploded view of a tenth structure of a drive apparatus according to an embodiment of this application.

FIG. 9 is an exploded view of a tenth structure of a drive apparatus according to an embodiment of this application. As shown in FIG. 9, a difference from the foregoing embodiments lies in that, in this embodiment, the first movable structure 20 is located on an outer side of the first fastening structure 30, and the second movable structure 50 is located on an outer side of the second fastening structure 40. For example, both the first movable structure 20 and the second movable structure 50 use a design manner of a movable frame. Specifically, the first fastening structure 30 is fastened to the substrate 10, and the second movable structure 50 is fastened to the first movable structure 20. The first fastening structure 30 is connected to the first movable structure 20 by using the first connecting piece 60, and the second fastening structure 40 is connected to the second movable structure 50 by using the second connecting piece 70. The image sensor may be placed on the second movable structure 50. The drive structure 80 is configured to drive the first movable structure 20 and the second movable structure 50 to move, to drive the image sensor to move. Correspondingly, a thicker area and a thinner area may be designed on the first fastening structure 30, and a thicker area and a thinner area may be designed on the second fastening structure 40. Respective thinner areas of the first fastening structure 30 and the second fastening structure 40 can be at least partially attached vertically, and respective thicker areas are staggered from each other vertically. For a specific design manner, refer to the design manners described in embodiments shown in FIG. 1(a) and FIG. 1(b). Details are not described herein again. It should be understood that corresponding variations may further be performed based on the drive apparatus shown in FIG. 9 with reference to related designs of the drive apparatus shown in FIG. 2(a) to FIG. 7(b). For details, refer to related descriptions of embodiments shown in FIG. 2(a) to FIG. 7(b), and accompanying drawings and text descriptions are not provided one by one herein again.

In the foregoing embodiments, the first fastening structure and the second fastening structure may be divided into different areas based on different thicknesses. Respective thinner areas of the first fastening structure and the second fastening structure are at least partially attached vertically, and respective thicker areas are staggered from each other vertically. Therefore, an overall thickness of the first fastening structure and the second fastening structure that are assembled together is less than a sum of a maximum thickness of the first fastening structure and a maximum thickness of the second fastening structure, thereby reducing an overall thickness of the drive apparatus and facilitating implementation of a light and thin design.

Based on the drive apparatus described in the foregoing embodiments, embodiments of this application further provide an image stabilization imaging apparatus and a terminal, which are separately described below.

Figure 10:
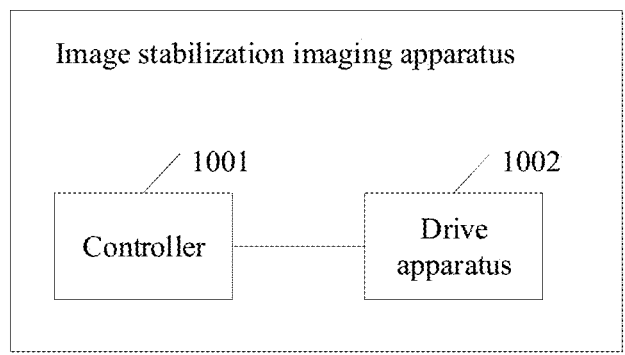
FIG. 10 is a diagram of a structure of an image stabilization imaging apparatus according to an embodiment of this application.

FIG. 10 is a diagram of a structure of an image stabilization imaging apparatus according to an embodiment of this application. As shown in FIG. 10, the image stabilization imaging apparatus includes a controller 1001 and a drive apparatus 1002, and the controller 1001 is electrically connected to the drive apparatus 1002. Specifically, the drive apparatus 1002 includes an image sensor, and the controller 1001 is configured to output a control signal to the drive apparatus, to control the drive apparatus to drive the image sensor to move, thereby implementing optical image stabilization. It should be noted that structures in the drive apparatus 1002 other than the image sensor may use a design manner in any one of embodiments in FIG. 1(a) to FIG. 9, and details are not described one by one herein again. In some possible implementations, a substrate of the drive apparatus 1002 is a PCB, and the controller 1001 may be integrated on the PCB.

The image stabilization imaging apparatus may be a component of a terminal. The following uses an example in which the terminal is a mobile phone for description.

Figure 11:
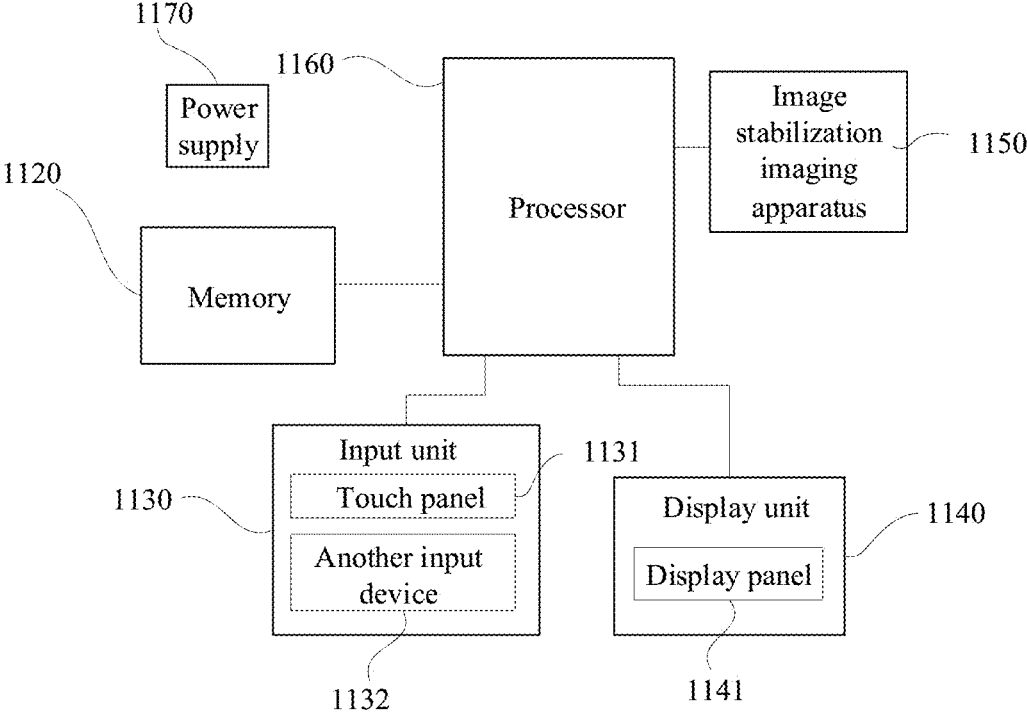
FIG. 11 is a diagram of a structure of a terminal according to an embodiment of this application.

FIG. 11 is a diagram of a structure of a terminal according to an embodiment of this application. As shown in FIG. 11, the mobile phone includes components such as a memory 1120, an input unit 1130, a display unit 1140, an image stabilization imaging apparatus 1150, a processor 1160, and a power supply 1170. Persons skilled in the art may understand that a structure of the mobile phone shown in FIG. 11 does not constitute any limitation on the mobile phone, and the mobile phone may include more or fewer components than those shown in the figure, or combine some components, or have different component arrangements.

The following describes components of the mobile phone in detail with reference to FIG. 11.

The memory 1120 may be configured to store a software program and a module. The processor 1170 performs various functional applications on the mobile phone and data processing by running the software program and the module that are stored in the memory 1120. The memory 1120 may mainly include a program storage area and a data storage area. The program storage area may store an operating system, an application program required by at least one function (for example, an audio playing function and an image playing function), and the like. The data storage area may store data (for example, audio data and an address book) created based on use of the mobile phone, and the like. In addition, the memory 1120 may include a high-speed random access memory, or may include a non-volatile memory, for example, at least one magnetic disk storage device, a flash memory device, or another volatile solid-state storage device.

The input unit 1130 may be configured to receive input digital or character information, and generate a key signal input related to user setting and function control of the mobile phone. Specifically, the input unit 1130 may include a touch panel 1131 and another input device 1132. The touch panel 1131, also referred to as a touchscreen, may collect a touch operation performed by a user on or near the touch panel 1131 (for example, an operation performed by the user on or near the touch panel 1131 by using any appropriate object or accessory such as a finger or a stylus), and drive a corresponding connection apparatus based on a preset program. Optionally, the touch panel 1131 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1180, and can receive and execute a command sent by the processor 1180. In addition, the touch panel 1131 may be implemented by using a plurality of types, such as a resistive type, a capacitive type, an infrared ray type, and a surface acoustic wave type. In addition to the touch panel 1131, the input unit 1130 may further include the another input device 1132. Specifically, the another input device 1132 may include but is not limited to one or more of a physical keyboard, a functional button (such as a volume control button or an on/off button), a trackball, a mouse, a joystick, and the like.

The display unit 1140 may be configured to display information input by the user or information provided for the user, and various menus of the mobile phone. In this embodiment of this application, the display unit 1140 is mainly configured to display an image obtained through photographing. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. When detecting a touch operation on or near the touch panel 1131, the touch panel 1131 transmits the touch operation to the processor 1160 to determine a type of a touch event. Then, the processor 1160 provides a corresponding visual output on the display panel 1141 based on the type of the touch event. In FIG. 11, the touch panel 1131 and the display panel 1141 serve as two independent components to implement input and input functions of the mobile phone. However, in some embodiments, the touch panel 1131 and the display panel 1141 may be integrated to implement the input and output functions of the mobile phone.

The controller 1160 may be configured to control an image sensor in the image stabilization imaging apparatus 1150 to move, to suppress an imaging blur caused by a shake of the mobile phone, thereby implementing a function of optical image stabilization. The image stabilization imaging apparatus 1150 may be the image stabilization imaging apparatus described in the embodiment shown in FIG. 10.

The processor 1160 is a control center of the mobile phone, and connects all parts of the entire mobile phone through various interfaces and lines. By running or executing the software program and/or the module stored in the memory 1120 and invoking data stored in the memory 1120, the processor 1160 performs various functions of the mobile phone and data processing, to perform overall monitoring on the mobile phone. In this embodiment of this application, the processor is mainly configured to invoke a program and instructions stored in the memory, and control the imaging apparatus by using the controller. Optionally, the processor 1160 may include one or more processing units. Preferably, the processor 1160 may integrate an application processor and a modem processor. The application processor mainly processes an operating system, a user interface, an application, and the like. The modem processor mainly processes wireless communication. It may be understood that the modem processor may not be integrated into the processor 1160. In this embodiment of this application, the processor 1160 may further perform processing such as denoising, enhancement, and partitioning and blurring on an image based on an obtained signal of the image sensor.

The mobile phone further includes a power supply 1170 (for example, a battery) that supplies power to various components. Preferably, the power supply may be logically connected to the processor 1160 by using a power management system, so that functions such as charging and discharging management and power consumption management are implemented by using the power management system.

It should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

The invention claimed is:

1. A drive apparatus, comprising:
a substrate;
a first movable structure;
a second movable structure;
a first fastening structure fastened to the substrate, the first fastening structure comprising a first area and a second area, wherein a thickness of the first area is less than a thickness of the second area;
a second fastening structure comprising a third area and a fourth area, wherein a thickness of the third area is less than a thickness of the fourth area, the first area is fixedly connected to the third area, the first area is located above the first area, and the second area and the fourth area do not overlap in a direction perpendicular to the substrate;
a first connecting piece connecting the first movable structure to the first fastening structure;
a second connecting piece connecting the second movable structure to the second fastening structure, wherein the second movable structure is fastened to the first movable structure; and
a drive structure located between the first fastening structure and the first movable structure, or between the second fastening structure and the second movable structure, wherein the drive structure is configured to drive the first movable structure and the second movable structure to move.

2. The drive apparatus according to claim 1, wherein:
the first movable structure is a movable platform;
the second movable structure is a movable frame; and
the drive apparatus further comprises an image sensor fastened to the first movable structure, wherein the image sensor is located on an inner side of the second movable structure.

3. The drive apparatus according to claim 2, wherein:

the first movable structure comprises a first concave cavity; and the image sensor is fastened in the first concave cavity.

4. The drive apparatus according to claim 1, wherein:

the second movable structure is a movable platform;

the first movable structure is a movable platform or a movable frame; and the drive apparatus further comprises an image sensor fastened to the second movable structure.

5. The drive apparatus according to claim 4, wherein:

the second movable structure comprises a second concave cavity; and the image sensor is fastened in the second concave cavity.

6. The drive apparatus according to claim 2, wherein:

the substrate is electrically connected to the first fastening structure;

the image sensor is electrically connected to the first movable structure; and the first movable structure is electrically connected to the first fastening structure by using the first connecting piece.

7. The drive apparatus according to claim 6, wherein:

the substrate is electrically connected to the second fastening structure;

the image sensor is electrically connected to the second movable structure; and the second movable structure is electrically connected to the second fastening structure by using the second connecting piece.

8. The drive apparatus according to claim 1, wherein:

the drive structure comprises first drive comb teeth and second drive comb teeth;

the first connecting piece comprises a first cantilever beam and a second cantilever beam;

a first end of the first movable structure is connected to the first fastening structure via the first cantilever beam, a second end of the first movable structure is connected to the first fastening structure via the second cantilever beam, and the first end and the second end of the first movable structure are two ends of the first movable structure in a first axial direction;

the first drive comb teeth comprise first fastening comb teeth and first movable comb teeth, the first fastening comb teeth and the first movable comb teeth are arranged in a staggered manner, the first movable comb teeth are connected to the first end of the first movable structure, and the first fastening comb teeth are connected to the first fastening structure;

the second drive comb teeth comprise second fastening comb teeth and second movable comb teeth, the second fastening comb teeth and the second movable comb teeth are arranged in a staggered manner, the second movable comb teeth are connected to the second end of the first movable structure, and the second fastening comb teeth are connected to the first fastening structure; and the first drive comb teeth and the second drive comb teeth are configured to drive the first movable structure and the second movable structure to move in the first axial direction.

9. The drive apparatus according to claim 8, wherein:

the drive structure further comprises third drive comb teeth and fourth drive comb teeth;

the second connecting piece comprises a third cantilever beam and a fourth cantilever beam;

a first end of the second movable structure is connected to the second fastening structure via the third cantilever beam, a second end of the second movable structure is connected to the second fastening structure via the fourth cantilever beam, and the first end and the second end of the second movable structure are two ends of the second movable structure in a second axial direction;

the third drive comb teeth comprise third fastening comb teeth and third movable comb teeth, the third fastening comb teeth and the third movable comb teeth are arranged in a staggered manner, the third movable comb teeth are connected to the first end of the second movable structure, and the third fastening comb teeth are connected to the second fastening structure;

the fourth drive comb teeth comprise fourth fastening comb teeth and fourth movable comb teeth, the fourth fastening comb teeth and the fourth movable comb teeth are arranged in a staggered manner, the fourth movable comb teeth are connected to the second end of the second movable structure, and the fourth fastening comb teeth are connected to the second fastening structure; and the third drive comb teeth and the fourth drive comb teeth are configured to drive the first movable structure and the second movable structure to move in the second axial direction.

10. The drive apparatus according to claim 1, wherein:

a first stopper structure is formed on the first fastening structure;

a second stopper structure is formed on the first movable structure; and the first stopper structure and the second stopper structure are configured to stop the first movable structure and the second movable structure in a plane parallel to the first movable structure.

11. The drive apparatus according to claim 1, wherein:

a third stopper structure is formed on the second fastening structure;

a fourth stopper structure is formed on the second movable structure; and the third stopper structure and the fourth stopper structure are configured to stop the first movable structure and the second movable structure in a plane parallel to the second movable structure.

12. The drive apparatus according to claim 1, wherein:

a fifth stopper structure is formed on the first movable structure;

a sixth stopper structure is formed on the second fastening structure; and the fifth stopper structure and the sixth stopper structure are configured to stop the first movable structure and the second movable structure in the direction perpendicular to the substrate.

13. The drive apparatus according to claim 1, wherein:

a seventh stopper structure is formed on the first fastening structure;

an eighth stopper structure is formed on the second movable structure; and the seventh stopper structure and the eighth stopper structure are configured to stop the first movable structure and the second movable structure in the direction perpendicular to the substrate.

14. The drive apparatus according to claim 1, wherein a boss or a through hole is provided on the substrate.

15. The drive apparatus according to claim 1, wherein:

the first fastening structure is a first fastening frame;

the first movable structure is located on an inner side of the first fastening frame;

the second fastening structure is a second fastening frame; and the second movable structure is located on an inner side of the second fastening frame.

16. The drive apparatus according to claim 1, wherein:

the first movable structure is a first movable frame;

the first fastening structure is located on an inner side of the first movable structure;

the second movable structure is a second movable frame; and the second fastening structure is located on an inner side of the second movable structure.

17. The drive apparatus according to claim 16, further comprising an image sensor fastened to the second movable structure.

18. The drive apparatus according to claim 1, wherein the substrate is a printed circuit board (PCB).

19. An image stabilization imaging apparatus, comprising:

a drive apparatus comprising:

an image sensor, a substrate, a first movable structure, a second movable structure, a first fastening structure fastened to the substrate, the first fastening structure comprising a first area and a second area, wherein a thickness of the first area is less than a thickness of the second area, a second fastening structure comprising a third area and a fourth area, wherein a thickness of the third area is less than a thickness of the fourth area, the first area is fixedly connected to the third area, the third area is located above the first area, and the second area and the fourth area do not overlap in a direction perpendicular to the substrate, a first connecting piece connecting the first movable structure to the first fastening structure, a second connecting piece connecting the second movable structure to the second fastening structure, wherein the second movable structure is fastened to the first movable structure, and a drive structure located between the first fastening structure and the first movable structure, or between the second fastening structure and the second movable structure, wherein the drive structure is configured to drive the first movable structure and the second movable structure to move; and a controller is electrically connected to the drive apparatus, wherein the controller is configured to output a control signal to the drive apparatus to control the drive apparatus to drive the image sensor to move.

20. A terminal, comprising:

an image stabilization imaging apparatus comprising:

a drive apparatus comprising:

an image sensor, a substrate, a first movable structure, a second movable structure, a first fastening structure fastened to the substrate, the first fastening structure comprising a first area and a second area, wherein a thickness of the first area is less than a thickness of the second area, a second fastening structure comprising third area and a fourth area, wherein a thickness of the third area is less than a thickness of the fourth area, the first area is fixedly connected to the third area, the third area is located above the first area, and the second area and the fourth area do not overlap in a direction perpendicular to the substrate, first connecting piece connecting the first movable structure to the first fastening structure, a second connecting piece connecting the second movable structure to the second fastening structure, wherein the second movable structure is fastened to the first movable structure, and a drive structure located between the first fastening structure and the first movable structure, or between the second fastening structure and the second movable structure, wherein the drive structure is configured to drive the first movable structure and the second movable structure to move, and a controller electrically connected to the drive apparatus, the controller configured to output a control signal to the drive apparatus to control the drive apparatus to drive the image sensor to move;

a processor; and a memory with program instructions stored thereon, wherein the processor, the memory, and the image stabilization imaging apparatus are connected to each other through a bus, and the program instructions, when executed by the processor, enable the processor to control the image stabilization imaging apparatus.

* * * * *